United States Patent
Chien

(10) Patent No.: US 9,645,748 B2
(45) Date of Patent: May 9, 2017

(54) METHOD AND SYSTEM FOR TRANSMISSION PATH OPTIMIZATION IN A STORAGE AREA NETWORK

(71) Applicant: HON HAI PRECISION INDUSTRY CO., LTD., New Taipei (TW)

(72) Inventor: Chin-Hung Chien, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/140,511

(22) Filed: Apr. 28, 2016

(65) Prior Publication Data

US 2016/0357457 A1    Dec. 8, 2016

(30) Foreign Application Priority Data

Jun. 3, 2015    (TW) .............................. 104117936 A

(51) Int. Cl.
  *G06F 3/00* (2006.01)
  *G06F 3/06* (2006.01)
  *H04L 29/08* (2006.01)

(52) U.S. Cl.
  CPC .......... *G06F 3/0613* (2013.01); *G06F 3/0607* (2013.01); *G06F 3/067* (2013.01); *G06F 3/0635* (2013.01); *G06F 3/0659* (2013.01); *H04L 67/1097* (2013.01)

(58) Field of Classification Search
  CPC ...... G06F 3/0613; G06F 3/0635; G06F 3/067; G06F 3/0607
  See application file for complete search history.

(56) References Cited

U.S. PATENT DOCUMENTS

2013/0117766 A1* 5/2013 Bax ...................... G06F 9/4405
  719/323
2013/0151646 A1* 6/2013 Chidambaram .... H04L 47/6205
  709/213

FOREIGN PATENT DOCUMENTS

| CN | 102394795 A | 3/2012 |
|---|---|---|
| CN | 103441948 A | 12/2013 |
| CN | 103825823 A | 5/2014 |

* cited by examiner

*Primary Examiner* — Ernest Unelus
(74) *Attorney, Agent, or Firm* — Steven Reiss

(57) ABSTRACT

A method and system for transmission path optimization in an Internet Small Computer System Interface (iSCSI) storage area network architecture comprises a storage device downloading input/output (I/O) profiles from an SAN Software Defined Network (SDN) application and a host computer connected to the storage device via various transmission paths, to access a first virtual disk. The storage device analyzes iSCSI packets in the first virtual disk, and calculates I/O data of the first virtual disk and updated I/O data (for second I/O profile) at time intervals. The storage device can determine to change the first I/O profile of the first virtual disk as against the second I/O profile and the SAN SDN application can command an SDN controller to optimize the transmission path between the host computer and the first virtual disk by making the change, based on comparisons against the second I/O profile.

10 Claims, 4 Drawing Sheets

| Transmission Paths | Cumulative Costs | Associative I/O Profiles |
|---|---|---|
| $G_0$-$XG_0$-$XG_1$-$XG_2$-$XG_3$ | 10+1+1+1=13 | Profile 7,8,9 |
| $G_0$-$G_2$-$XG_1$-$XG_2$-$XG_3$ | 10+10+1+1=22 | Profile 7,8,9 |
| $G_0$-$G_1$-$G_3$-$XG_3$ | 10+10+10=30 | Profile 4,5,6 |
| $G_0$-$G_2$-$G_3$-$XG_3$ | 10+10+10=30 | Profile 4,5,6 |
| $G_0$-$G_1$-$G_3$-$XG_2$-$XG_3$ | 10+10+10+1=31 | Profile 4,5,6 |
| $G_0$-$G_2$-$G_3$-$XG_2$-$XG_3$ | 10+10+10+1=31 | Profile 2,3 |
| $G_0$-$G_2$-$XG_1$-$XG_2$-$G_3$-$XG_3$ | 10+10+1+10+10=41 | Profile 1 |

FIG. 3

METHOD AND SYSTEM FOR TRANSMISSION PATH OPTIMIZATION IN A STORAGE AREA NETWORK

FIELD

The subject matter herein generally relates to Storage Area Network (SAN) technology.

BACKGROUND

A storage area network (SAN) is a network which provides access to consolidated, block level data storage. SANs are primarily used to enhance storage devices, such as disk arrays, tape libraries, and optical jukeboxes, and are accessible to servers so that the storage devices appear to the operating system as locally attached devices. A SAN typically has its own network of storage devices that are generally not accessible through a local area network (LAN) by other devices.

An Internet Small Computer System Interface (iSCSI) protocol is a SAN protocol which allows iSCSI initiators to use storage devices on a (remote) iSCSI target using normal ethernet cabling. To the iSCSI initiator, the remote storage looks like a normal, locally-attached hard drive. The initiator, for example, a client computer host, is a client device for transmitting access requests, while a target is, for example, a storage device for providing an access service.

A traditional iSCSI SAN architecture cannot dynamically adjust a transmission path from the initiator to the target. Three host computers, for example, connect to a local network via identical switches and access different virtual disks of a storage device through the iSCSI protocol. Under the traditional network architecture, transmission paths for iSCSI data streams between each of the three host computers and the storage devices are fixed and unchangeable. However, bandwidth requirements for different host computers or a single host computer at different time slots may be different. Existing network management methods cannot adjust the transmission path in real time according to current bandwidth availabilities and requirements, which is unable to achieve effective network resources utilization.

BRIEF DESCRIPTION OF THE DRAWINGS

Implementations of the present technology will be described, by way of example only, with reference to the attached figures, wherein:

FIG. 3 illustrates a diagrammatic view of one embodiment of cumulative cost and associated I/O profiles corresponding to the transmission paths shown in FIG. 2.

DETAILED DESCRIPTION

Figure 1:
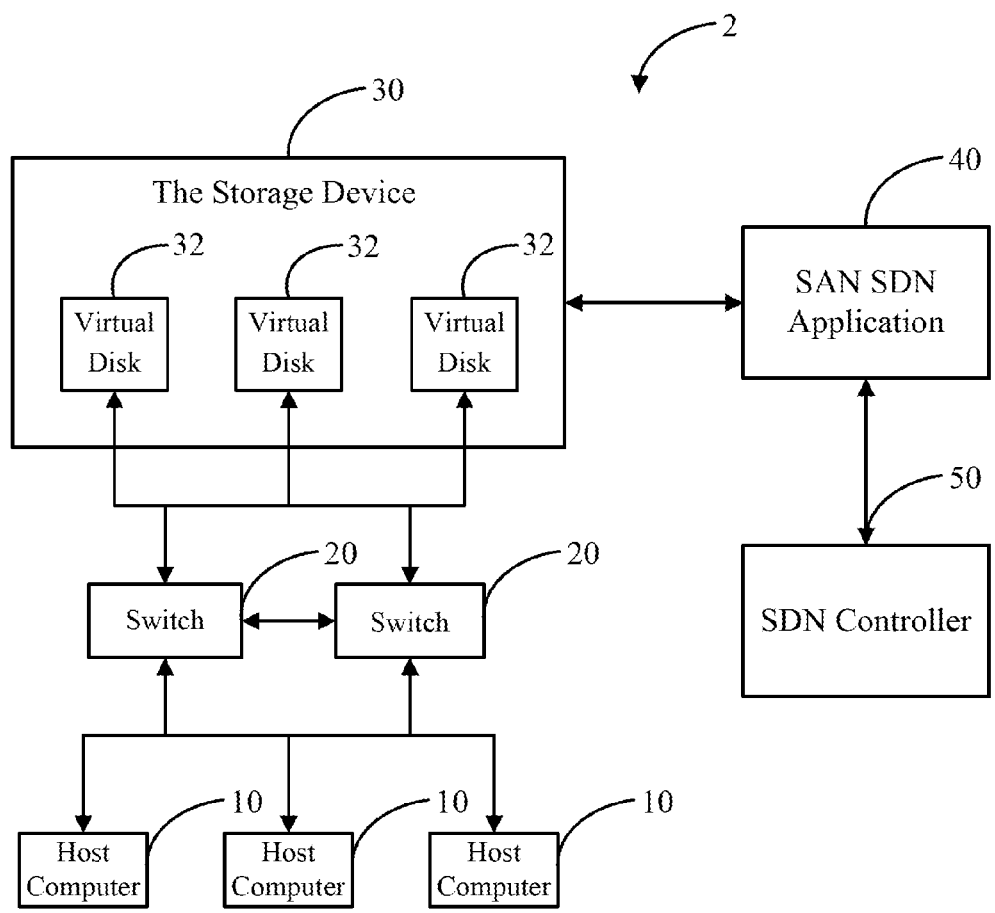
FIG. 1 illustrates a diagrammatic view of one embodiment of a system for transmission path optimization.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates one embodiment of a system 2 for transmission path optimization. In the embodiment, the system 2 includes at least a host computer 10, a switch 20, a storage device 30, an SAN Software Defined Networking (SDN) application 40 and an SDN controller 50. The storage device 30 comprises a plurality of virtual disks 32.

The SAN SDN application 40 configures input/output (I/O) profiles for each virtual disk 32 of the storage device 30. The storage device 30 connects to the SAN SDN application 40. After validation, the storage device 30 downloads a set of I/O profiles for each virtual disk 32 from the SAN SDN application 40 and uses one of the I/O profiles as the first I/O profile. A profile manager (not shown in FIG. 1) of the storage device 30 manages the set of I/O profiles and periodically downloads latest I/O profiles from the SAN SDN application 40.

Figure 2:
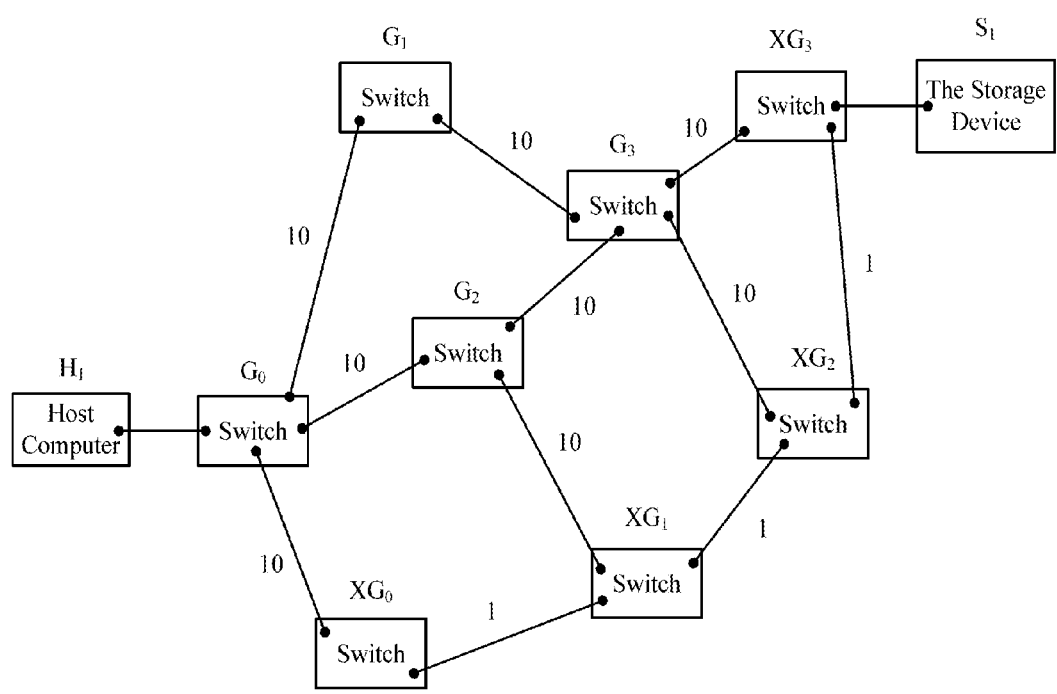
FIG. 2 illustrates a diagrammatic view of transmission paths.

The host computer 10 connects to the storage device 30 via at least one transmission path which is composed of one or more switches 20 to access a first virtual disk of the virtual disks 32. For example, FIG. 2 illustrates transmission paths between the host computer $H_1$ and the storage device $S_1$ where the host computer $H_1$ connects to the switch $G_0$, while the storage device $S_1$ connects to switch $XG_3$. There are seven different transmission paths, composed of one or more of the switches $G_1$, $G_2$, $G_3$, $XG_0$, $XG_1$, and $XG_2$, between the switch $G_0$ and the switch $XG_3$.

The storage device 30 analyzes iSCSI packets transmitted from the host computer 10 to the first virtual disk 32 and calculates I/O data of the first virtual disk 32. In the embodiment, the I/O data comprises throughput and Input/Output Operations Per Second (IOPS). The storage device 30 determines whether SCSI commands in iSCSI packets are I/O commands, and, when the SCSI commands are I/O commands, accumulates the number of the I/O commands and the amount of the I/O data to calculate the throughput and the IOPS.

Then, the storage device 30 determines whether to change the first I/O profile of the first virtual disk 32 according to the analysis. Each of the I/O profiles is configured with different ranges of throughput and IOPS corresponding to different I/O levels, such as high, medium and low. In the embodiment, the storage device 30 compares calculated I/O data with I/O data of all the I/O profiles of the first virtual disk 32 at time intervals to find a second I/O profile which matches with the first virtual disk 32. The storage device 30 can determine to change the first I/O profile of the first virtual disk 32 when the second I/O profile is different from the first I/O profile.

The storage device 30 commands the SAN SDN application 40 to change the first I/O profile to the second I/O profile.

The SAN SDN application 40 commands the SDN controller 50 to optimize one of the at least one transmission path between the host computer 10 and the first virtual disk 32 based on the second I/O profile. The SDN controller 50 finds all the transmission paths between the host computer 10 and the first virtual disk 32 and calculates the measurement values (metrics) of each of the transmission paths. In the embodiment, the metrics can be calculated by link state routing protocol. The link state routing protocol is implemented by the Open Shortest Path First (OSPF) algorithm or the Enhanced Interior Gateway Routing Protocol (EIGRP). For example, the OSPF algorithm uses link cost as the metrics. In a network section, a faster speed and a greater bandwidth will reduce the link cost, which may be calculated out. The SDN controller 50 selects a first transmission path from all the transmission paths, which is the optimal transmission path for the second I/O profile, according to path lengths, metrics, and load balances of each of the transmission paths.

Referring to FIG. 2, for example, the switches $G_0$~$G_3$ are GbE switches and the switches $XG_0$~$XG_3$ are 10 GbE switches. The link cost of the GbE switch is 10 and the link cost of the 10 GbE switch is 1. FIG. 3 illustrates one embodiment of cumulative cost and associated I/O profiles corresponding to the transmission paths shown in FIG. 2. For example, the cumulative cost of the transmission path $G_0$-$XG_0$-$XG_1$-$XG_2$-$XG_3$ is equal to 13(10+1+1+1), the associated I/O profiles include 7, 8, and 9. According to the calculation in FIG. 3, the SDN controller 50 can select the first transmission path between the host computer $H_1$ and the storage device $S_1$.

After the SDN controller 50 optimizes one of the at least one transmission path, the iSCSI packets sent by the host computer 10 are transmitted to the storage device 30 via the first transmission path.

Figure 4:
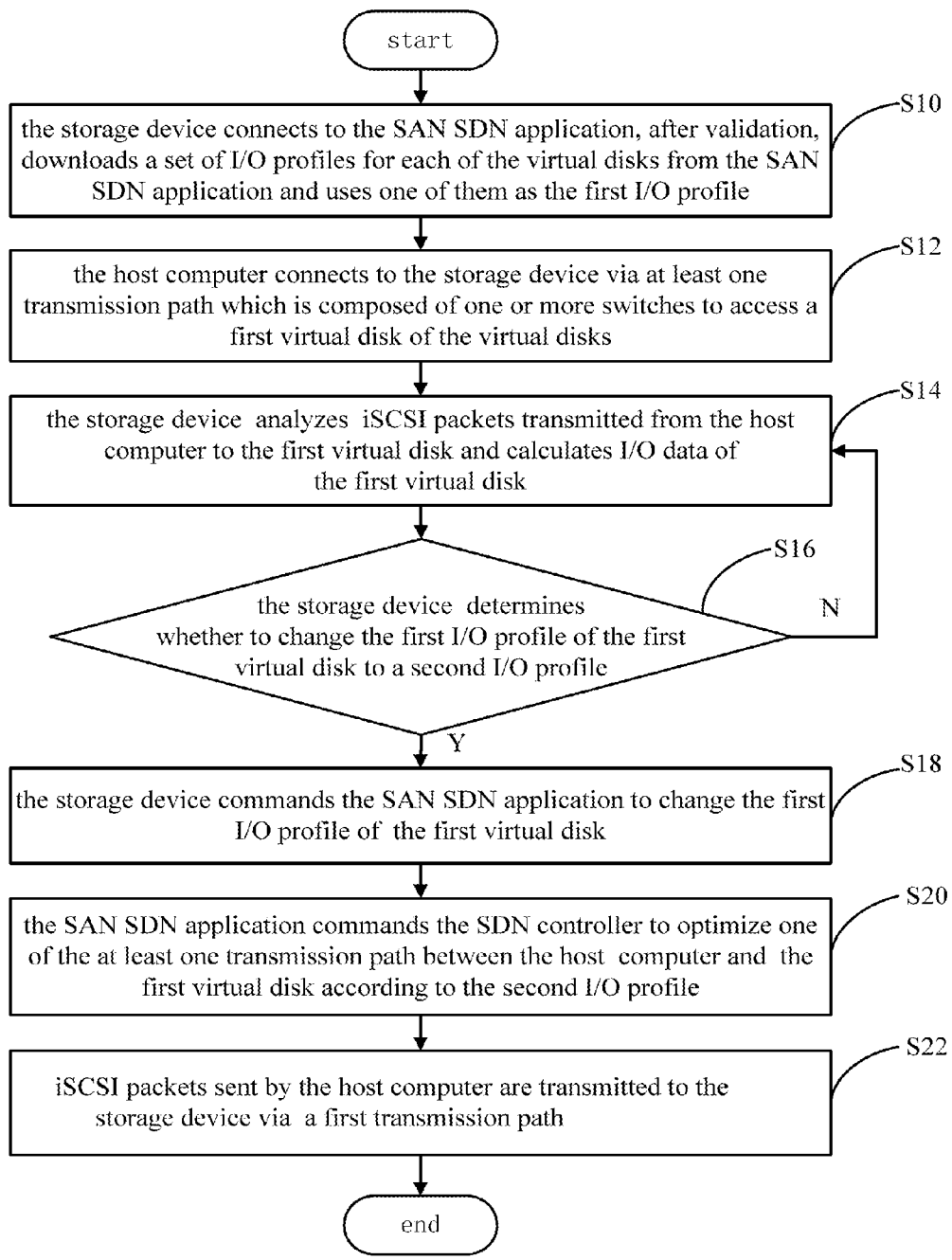
FIG. 4 illustrates a diagrammatic view of one embodiment of a method for transmission path optimization.

FIG. 4 illustrates one embodiment of a method for transmission path optimization.

At block 10, the storage device 30 connects to the SAN SDN application 40. After validation, the storage device 30 downloads a set of I/O profiles for each virtual disk 32 from the SAN SDN application 40.

At block 12, the host computer 10 connects to the storage device 30 via at least one transmission path which is composed of one or more switches 20 to access the first virtual disk 32.

At block 14, the storage device 30 analyzes the iSCSI packets transmitted from the host computer to the first virtual disk 32 and calculates I/O data of the first virtual disk 32. In the embodiment, the I/O data comprises throughput and IOPS. The storage device 30 determines whether SCSI commands in the iSCSI packets are I/O commands, and, when the SCSI commands are the I/O commands, accumulates the number of the I/O commands and the amount of the I/O data to calculate the throughput and the IOPS.

At block 16, the storage device 30 can determine to change the first I/O profiles of the first virtual disk 32 according to the analysis. Each of the first I/O profiles is configured with different ranges of throughput and the quantity of the IOPS corresponding to different I/O levels, such as high, medium and low. In the embodiment, the storage device 30 compares calculated I/O data with the I/O data of the first I/O profiles of the first virtual disk 32 at time intervals to find the second I/O profiles. The storage device 30 determines to change the first I/O profiles of the first virtual disk 32 when the second I/O profiles are different from the first I/O profiles. When the first I/O profiles of the virtual disk 32 need to be changed, method proceed to step S18. If change not required, method return to step S14.

At block 18, the storage device 30 commands the SAN SDN application 40 to change the first I/O profiles to the second I/O profiles.

At block 20, the SAN SDN application 40 commands the SDN controller 50 to optimize one of the at least one transmission path between the host computer 10 and the first virtual disk 32 based on the second I/O profile. The SDN controller 50 finds all of the transmission paths between the host computer 10 and the first virtual disk 32, and calculates the metric of each of the transmission paths. In the embodiment, the metrics may be calculated by link state routing protocol. The link state routing protocol is implemented by the OSPF or the EIGRP algorithms. For example, the OSPF algorithm can use link cost as the metrics. In a network section, faster speed and greater bandwidth decrease link cost, which may be calculated. The SDN controller 50 selects the first transmission path from all of the transmission paths for the second I/O profile according to path lengths, metrics and load balances of each of the transmission paths.

At block 22, the iSCSI packets sent by the host computer 10 are transmitted to the storage device 30 via the first transmission path.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for transmission path optimization in a storage area network operable for at least one transmission path between a host computer and a storage device in an Internet Small Computer System Interface (iSCSI) storage local network, the method comprises downloading, by the storage device, a set of input/output (I/O) profiles for each virtual disk of a plurality of virtual disks of the storage device from an SAN Software Defined Networking (SDN) application, and using one of the I/O profiles as the first I/O profile, wherein each of the I/O profiles comprises different ranges of throughput and Input/Output Operations Per Second (IOPS);

connecting, by the host computer, to the storage device via at least one transmission path which is composed of one or more switches to access a first virtual disk of the virtual disks;

analyzing, by the storage device, iSCSI packets transmitted from the host computer to the first virtual disk and calculating I/O data of the first I/O profile of the first virtual disk, wherein the I/O data comprises throughput and IOPS;

determining, by the storage device, whether to change the first I/O profile of the first virtual disk according to the analysis, and when changing the first I/O profile of the first virtual disk according to the analysis, commanding the SAN SDN application to change the first I/O profile of the first virtual disk; and commanding, by the SAN SDN application, an SDN controller to optimize one of the at least one transmission path between the host computer and the first virtual disk using the second I/O profile.

2. The method of claim 1, wherein further comprises:
determining, by the storage device, whether SCSI commands in the iSCSI packets are I/O commands; and
accumulating, by the storage device, the number of the I/O commands and the amount of the I/O data when the SCSI commands are I/O commands to calculate the throughput and the IOPS.

3. The method of claim 1, wherein the determining step further comprises:
Comparing the calculated I/O data with the I/O data of all the I/O profiles of the first virtual disk at time intervals to find a second I/O profile which is matched with the first virtual disk; and
determining to change the first I/O profile of the first virtual disk when the second I/O profile is different from the first I/O profile of the first virtual disk.

4. The method of claim 1, wherein the optimizing step further comprises:
finding all of the transmission paths between the host computer and the first virtual disk;
calculating metrics of each of the transmission paths; and
selecting a first transmission path from all of the transmission paths for the second I/O profile according to path lengths, metrics, and load balances of each of the transmission paths.

5. The method of claim 4, wherein the metrics are cumulative link cost of each of the transmission paths which are calculated according to link state routing protocol.

6. A system for transmission path optimization in a storage area network operable between a host computer and a storage device in an Internet Small Computer System Interface (iSCSI) storage local network, the system comprises at least a host, switch, storage device, an SAN Software Defined Network (SDN) application and an SDN controller, wherein:
the storage device downloading a set of input/output (I/O) profiles for each virtual disk of a plurality of virtual disks of the storage device from an SAN Software Defined Network (SDN) application and using one of the I/O profiles as the first I/O profile, wherein each of the I/O profiles comprises different ranges of throughput and Input/Output Operations Per Second (IOPS);

the host computer connecting to the storage device via at least one transmission path which is composed of one or more switches to access a first virtual disk of the virtual disks;

the storage device analyzing iSCSI packets transmitted from the host computer to the first virtual disk and calculating I/O data of the first I/O profile of the first virtual disk, wherein the I/O data comprises throughput and IOPS;

the storage device determining whether to change the first I/O profile of the first virtual disk according to the analysis, and when changing the first I/O profile of the first virtual disk according to the analysis, commanding the SAN SDN application to change the first I/O profile of the first virtual disk; and the SAN SDN application commanding an SDN controller to optimize one of the at least one transmission path between the host computer and the first virtual disk using the second I/O profile.

7. The system of claim 6, wherein the storage device further configured to:
determine whether SCSI commands in the iSCSI packets are I/O commands; and
accumulate the number of I/O commands and the amount of the I/O data when the SCSI commands are I/O commands to calculate the throughput and the IOPS.

8. The system of claim 6, wherein the storage device further configured to:
compare calculated I/O data with I/O data of all the I/O profiles of the first virtual disk to find a second I/O profile which is matched with the first virtual disk; and
determine to change the first I/O profile of the first virtual disk when the second I/O profile is different from the first I/O profile.

9. The system of claim 6, wherein the SDN controller further configured to:
find all of the transmission paths between the host computer and the first virtual disk;
calculate metrics of each of the transmission paths; and
select a first transmission path from all of the transmission paths for the second I/O profile according to path lengths, metrics, and load balances of each of the transmission paths.

10. The system of claim 9, wherein the metrics are cumulative link cost of each of the transmission paths which are calculated according to link state routing protocol.

* * * * *